(12) United States Patent
Hirono et al.

(10) Patent No.: US 9,508,990 B2
(45) Date of Patent: Nov. 29, 2016

(54) SI-BASED-ALLOY ANODE MATERIAL

(71) Applicant: Sanyo Special Steel Co., Ltd., Himeji-shi (JP)

(72) Inventors: Tomoki Hirono, Himeji (JP); Tetsuro Kariya, Himeji (JP); Toshiyuki Sawada, Himeji (JP)

(73) Assignee: Sanyo Special Steel Co., Ltd., Himeji-shi (JP)

( * ) Notice: Subject to any disclaimer, the term of this patent is extended or adjusted under 35 U.S.C. 154(b) by 186 days.

(21) Appl. No.: 14/346,112

(22) PCT Filed: Jan. 30, 2013

(86) PCT No.: PCT/JP2013/051994
§ 371 (c)(1),
(2) Date: Mar. 20, 2014

(87) PCT Pub. No.: WO2013/115223
PCT Pub. Date: Aug. 8, 2013

(65) Prior Publication Data
US 2014/0370386 A1 Dec. 18, 2014

(30) Foreign Application Priority Data

Feb. 1, 2012 (JP) .................................. 2012-019622
Dec. 19, 2012 (JP) .................................. 2012-276615

(51) Int. Cl.
*H01M 4/88* (2006.01)
*H01M 4/38* (2006.01)
(Continued)

(52) U.S. Cl.
CPC .............. *H01M 4/386* (2013.01); *C22C 9/00* (2013.01); *C22C 9/02* (2013.01); *C22C 9/04* (2013.01);
(Continued)

(58) Field of Classification Search
CPC ........ H01M 4/386; H01M 4/38; H01M 4/40; H01M 4/50; B22F 9/002
USPC ............... 252/182.1; 429/218.1, 220, 231.95
See application file for complete search history.

(56) References Cited

U.S. PATENT DOCUMENTS

| 7,378,041 B2 | 5/2008 | Asao et al. |
| 2003/0134198 A1 | 7/2003 | Sawa et al. |

(Continued)

FOREIGN PATENT DOCUMENTS

| CN | 101675546 A | 3/2010 |
| EP | 1463131 A1 | 9/2004 |

(Continued)

OTHER PUBLICATIONS

Office Action issued in corresponding Korean Patent Application No. 10-2014-7003646, Apr. 20, 2015.
(Continued)

*Primary Examiner* — Khanh Tuan Nguyen
(74) *Attorney, Agent, or Firm* — The Webb Law Firm (57) ABSTRACT

Disclosed is a Si-based alloy anode material for lithium ion secondary batteries, including an alloy phase with a Si principal phase including Si and a compound phase including two or more elements, which includes a first additional element A selected from Ti, V, Cr, Mn, Fe, Co, Ni, Cu, Zr, Nb and Mg and a low-melting second additional element B selected from S, Se, Te, Sn, In, Ga, Pb, Bi, Zn, Al. This compound phase includes (i) a first compound phase including Si and the first additional element A; a second compound phase including the first additional element A and the second additional element B; and one or both of a third compound phase including two or more of the second additional elements B and a single phase of the second additional element B.

12 Claims, 3 Drawing Sheets

(51) Int. Cl.
  *H01M 10/0525*  (2010.01)
  *C22C 9/00*  (2006.01)
  *C22C 9/02*  (2006.01)
  *C22C 9/04*  (2006.01)
  *C22C 28/00*  (2006.01)
  *H01M 4/134*  (2010.01)

(52) U.S. Cl.
  CPC .......... *C22C 28/00* (2013.01); *H01M 10/0525* (2013.01); *H01M 4/134* (2013.01); *H01M 2220/10* (2013.01); *H01M 2220/20* (2013.01); *H01M 2220/30* (2013.01)

(56) References Cited

U.S. PATENT DOCUMENTS

| | | |
|---|---|---|
| 2006/0046144 A1 | 3/2006 | Obrovac |
| 2007/0020521 A1 | 1/2007 | Obrovac et al. |
| 2007/0148544 A1 | 6/2007 | Le |
| 2007/0148549 A1 | 6/2007 | Kobayashi et al. |
| 2008/0206631 A1 | 8/2008 | Christensen et al. |
| 2010/0270497 A1 | 10/2010 | Hezeque et al. |
| 2013/0302691 A1 | 11/2013 | Sawada |

FOREIGN PATENT DOCUMENTS

| | | | | |
|---|---|---|---|---|
| JP | 10312804 A | 11/1998 | | |
| JP | 2001297757 A | 10/2001 | | |
| JP | 2004228059 A | 8/2004 | | |
| JP | 200511650 A | 1/2005 | | |
| JP | 200544672 A | 2/2005 | | |
| JP | 2005-071771 | * 3/2005 | ............. | H01M 4/38 |
| JP | 2007172954 A | 7/2007 | | |
| JP | 2009-032644 | * 2/2009 | ............. | H01M 4/38 |
| JP | 2010519718 A | 6/2010 | | |
| JP | 4739462 B1 | 5/2011 | | |
| JP | 4865105 B1 | 11/2011 | | |
| JP | 2012150910 A | 8/2012 | | |
| JP | 2012178344 A | 9/2012 | | |
| WO | WO 2008106280 A1 | * 9/2008 | ............. | H01M 4/38 |
| WO | 2012099056 A1 | 7/2012 | | |

OTHER PUBLICATIONS

Office Action issued in corresponding Chinese Patent Application No. 201380003431.7, Mar. 4, 2016.

Office Action issued in Corresponding Korean Patent Application No. 10-2014-7003646, Oct. 29, 2015.

* cited by examiner

SI-BASED-ALLOY ANODE MATERIAL

CROSS-REFERENCE TO RELATED APPLICATIONS

This application is the United States national phase of International Application No. PCT/JP2013/051994 filed Jan. 30, 2013 and claims priority to Japanese Patent Application No. 2012-19622 filed on Feb. 1, 2012 and to Japanese Patent Application No. 2012-276615 filed on Dec. 19, 2012, the entire disclosures of which are incorporated herein by reference.

TECHNICAL FIELD

The present invention relates to Si-based alloy anode materials with superior electrical conductivity, for electricity storage devices such as lithium ion secondary batteries and hybrid capacitors in which lithium ions move during charging and discharging.

BACKGROUND ART

In recent years, with the spread of mobile devices, high-performance secondary batteries including lithium ion batteries have been actively developed. In addition, as stationary electricity storage devices for cars and for home use, hybrid capacitors in which lithium ion secondary batteries and reaction mechanism thereof are applied to an anode have been actively developed. As anode materials in the electricity storage devices, there have been used carbonaceous materials such as natural graphite, artificial graphite and coke which can absorb and desorb lithium ions. However, since these carbonaceous materials allow lithium ions to be inserted into between carbon faces, the theoretical capacity when used as an anode is 372 mAh/g at most. Thus, novel materials which can replace the carbonaceous materials have been actively searched for the purpose of improving capacity.

On the other hand, Si has been drawing attention as a material which can replace the carbonaceous materials. This is because Si can absorb a large amount of lithium to form a compound represented as $Li_{22}Si_5$ and thus can significantly increase the capacity of the anode as compared to the case where the carbonaceous materials are used, so that Si has a potential for increasing the electricity storage capacity of lithium ion secondary batteries or hybrid capacitors.

However, when Si is used singly as the anode material, there was a problem that life of the electricity storage devices is extremely short, because Si phases are micronized by repetition of expansion at the time of alloying with lithium during charge and constriction at the time of dealloying of lithium during discharge, resulting in defects such as detachment of Si phases from an electrode substrate during use and loss of electrical conductivity between the Si phases.

In addition, since Si has an electrical conductivity lower than carbonaceous materials and metal materials and thus limits effective movement of electrons during charging and discharging, Si is used as the anode materials in combination with materials which supplement electrical conductivity, such as carbonaceous materials. Even in this case, however, there is also a problem with charge-discharge performances, particularly with initial charge-discharge and charge-discharge performances at high efficiency.

As a means of solving such problems at the time of using such Si phase as the anode, there are proposed, for example, in JP2001-297757A (Patent Literature 1) and JPH10-312804A (Patent Literature 2), materials or production methods in which at least a part of a lithium-compatible phase, such as Si, is surrounded by an intermetallic compound of Si and a metal as represented by transition metals.

Further, as another solution, there are proposed, for example, in JP2004-228059A (Patent Literature 3) and JP2005-44672A (Patent Literature 4), electrodes or production methods in which an active material phase containing Si phase is coated with a conductive material such as Cu which is not alloyed with lithium.

SUMMARY OF INVENTION

However, in the above-mentioned methods of coating the active material phases with the conductive materials such as Cu, it is necessary to coat the active material phases by a technique such as Cu plating before or after a step of forming the active material phases containing Si phases for the electrodes. In addition, there is a problem that it is industrially cumbersome to control the coating film thickness and the like.

Further, a material in which at least a part of a lithium-compatible phase, such as Si, is surrounded by an intermetallic compound is industrially preferable in terms of process because the lithium-compatible phase and the intermetallic compound are formed during solidification process after melting. In terms of structure, however, there is a problem that it is impossible to attain a Si phase size enough to prevent the Si phase from being micronized.

Accordingly, an object of the present invention is to provide a Si-based alloy anode material with superior charge-discharge properties, for electricity storage devices in which lithium ions move during charging and discharging, such as lithium ion secondary batteries and hybrid capacitors, by controlling composition, structure, structure size and others of the Si phase and the intermetallic compound phase in the Si-based alloy.

In order to solve the above-mentioned problems, through extensive development, the inventors have found a material with large charge-discharge capacity and superior cycle life. Generally, the amount of Si as an active material must be large for a large charge-discharge capacity. However, Si causes a volume expansion as much as about 400% during lithium absorption/desorption, and thus it is attempted to surround Si alloy containing a reduced amount of Si or the Si phase with an intermetallic compound phase in order to extend cycle life. The inventors have found a Si-based eutectic alloy that forms a microstructure with Si phase, and thereby made it possible to provide an anode material with satisfactory charge-discharge capacity and cycle life. It was also found that, in the microstructure of the eutectic alloy, the average minor axis width of the Si phase, which is the principal phase, is preferred to be 4 μm or less. This is because, by finely forming the Si phase so that the average minor axis width is 4 μm or less, it is possible to prevent micronization due to volume expansion during lithium absorption/desorption to/from Si, i.e., electrical isolation of Si and detachment of Si from an electrode.

Further, not only by fining the Si phase but also by forming the eutectic alloy, the fine Si phase is surrounded by a compound phase comprising Si and one or more of a first additional element A selected from Ti, V, Cr, Mn, Fe, Co, Ni, Cu, Zr, Nb and Mg, in other words, an intermetallic compound phase, which alleviates stress caused by the volume expansion during the lithium absorption/desorption to/from Si and plays a role in preventing collapse of the electrode and the electrical isolation of Si.

Furthermore, in the presence of the compound phase comprising the above first additional element A and one or more of a low-melting second additional element B selected from S, Se, Te, Sn, In, Ga, Pb, Bi, Zn, Al and Ag in the periphery of the Si phase and the compound phase comprising Si and the first additional element A, the Si phase is covered with an intermetallic compound phase that is softer than the phase of compound comprising Si and the first additional element A, to doubly alleviate the stress caused by the volume expansion during the lithium absorption/desorption to/from Si, so that the intermetallic compound phase plays a role in preventing the collapse of the electrode and the electrical isolation of Si and further shows an electrode characteristic effect with superior cycle life.

Additionally (or alternatively), in the presence of a compound phase comprising two or more of the above low-melting second additional elements B and/or a single phase of the above low-melting second additional element B in a manner that dots around or surrounds the Si phase, an intermetallic compound phase or single metallic phase that is softer than the above intermetallic compound phases are formed to alleviate the stress caused by the volume expansion during the lithium absorption/desorption to/from Si, in a triple or quadruple way (or in a double or triple way). Moreover, by enhancing adhesion with charge collectors such as Cu, effects of improving the suppression of electrode expansion and the charge-discharge cycle characteristics are expected.

In view of these, providing Si eutectic alloy to form Si microstruture of non-conventional size as well as having the Si phase surrounded doubly, triply or quadruply by flexible intermetallic compound phases with satisfactory electrical conductivity makes it possible to suppress a sudden drop in discharge capacity associated with cycles which is caused by electrical isolation of Si resulting from detachment of active materials from the electrode and micronization of Si due to the stress caused by the volume expansion during the lithium absorption/desorption. The inventors thus found superior effects of secondary battery anode materials satisfactory both in charge-discharge capacity and cycle life to reach the present invention.

According to an aspect of the present invention, there is provided a Si-based alloy anode material for lithium ion secondary batteries, comprising an alloy phase composed of a Si principal phase comprising Si and a compound phase comprising two or more elements, wherein the two or more elements comprise a first additional element A being at least one selected from the group consisting of Ti, V, Cr, Mn, Fe, Co, Ni, Cu, Zr, Nb and Mg and a low-melting second additional element B being at least one selected from the group consisting of S, Se, Te, Sn, In, Ga, Pb, Bi, Zn, Al and Ag, wherein the compound phase comprises:

a first compound phase comprising Si and the first additional element A;
a second compound phase comprising the first additional element A and the second additional element B; and
one or both of a third compound phase comprising two or more of the second additional elements B and a single phase of the second additional element B, or, alternatively, comprises:
a compound phase comprising Si and the first additional element A; and
one or both of a compound phase comprising two or more of the second additional elements B and a single phase of the second additional element B, and wherein the Si principal phase has an average minor axis width of 4 µm or less.

According to a preferred aspect of the present invention, the compound phase comprising two or more of elements comprises a first compound phase comprising Si and the first additional element A; a second compound phase comprising the first additional element A and the second additional element B; and one or both of a third compound phase comprising two or more of the second additional elements B and a single phase of the second additional element B. Alternatively, according to another preferred aspect of the present invention, the compound phase comprising two or more of elements comprises a compound phase comprising Si and the first additional element A; and one or both of a compound phase comprising two or more of the second additional elements B and a single phase of the second additional element B. The various limitations described below are applied to the both of the above aspects.

DESCRIPTION OF EMBODIMENT

Si-Based Alloy Anode Material

The present invention relates to a Si-based alloy anode material for lithium ion secondary batteries. The Si-based alloy anode material comprises an alloy phase composed of a Si principal phase comprising Si and a compound phase comprising two or more elements. Typically, the Si-based alloy anode material consists essentially of or consists of these phases. The above-mentioned two or more elements for constituting the compound phase comprise a first additional element A and a second additional element B. The first additional element A is one or more elements selected from the group consisting of Ti, V, Cr, Mn, Fe, Co, Ni, Cu, Zr, Nb and Mg, while the second additional element B is one or more low-melting elements selected from the group consisting of S, Se, Te, Sn, In, Ga, Pb, Bi, Zn, Al and Ag. The above-mentioned compound phases comprise (i) a first compound phase comprising Si and the first additional element A; a second compound phase comprising the first additional element A and the second additional element B; and one or both of a third compound phase comprising two or more of the second additional elements B and a single phase of the second additional element B, and, preferably, consist essentially of or consist of these phases. Alternatively, the above-mentioned compound phases comprise (ii) a compound phase comprising Si and the first additional element A; and one or both of a compound phase comprising two or more of the second additional elements B and a single phase of the second additional element B and, preferably, consist essentially of or consist of the above-mentioned phases. The Si principal phase has an average minor axis width of 4 µm or less.

By the way, the charge-discharge capacity of lithium ion secondary batteries is determined by amount of movement of lithium. Therefore, a substance which can absorb and desorb a large amount of lithium is demanded. Although use of a lithium metal as the anode material is the most efficient, it has a problem of safety such as ignition of a battery caused by formation of dendrite during charging and discharging. Recently, research of alloys which can absorb and desorb a larger amount of lithium has been conducted and, among the alloys, Si is considered promising as the substance which can absorb or desorb a large amount of lithium. Accordingly, Si is adopted as a principal phase of the alloy phase.

However, since Si allows about 400% volume expansion during the lithium absorption/desorption, Si is separated and detached from an electrode and cannot keep contact with charge collectors, so that a sudden drop in charge-discharge capacity associated with cycles takes place. Further, too large size of Si phase causes micronization of Si through repetition of a process such that reaction with lithium does not proceed to the inside of the Si phase but causes expansion from the surface layer which is easily reactable with lithium to generate cracks and subsequently the interior unreacted Si phase is expanded to cause cracks again. In this way, Si is separated and detached from the electrode and cannot keep contact with charge collectors, so that the sudden drop in charge-discharge capacity associated with cycles takes place.

In regard to the above two points, by two improvement methods of finely forming the Si phase and surrounding the Si phase with phases which alleviate or absorb stress caused by about 400% volume expansion during the lithium absorption/desorption of Si, the separation and detachment of Si from the electrode and the non-contact of Si with charge collectors were prevented.

Thus, by forming a eutectic alloy with Si to obtain the fine Si phase as well as by incorporating one or more of a first additional element A selected from Ti, V, Cr, Mn, Fe, Co, Ni, Cu, Zr, Nb and Mg which can form an intermetallic compound that is more conductive than Si and is flexible, the fine Si phase is surrounded by a compound phase comprising Si and the first additional element A, which plays a role in mitigating the micronization of Si and the stress caused by the volume expansion during the lithium absorption/desorption to/from Si and in preventing collapse of the electrode and the electrical isolation of Si.

Further, a compound phase comprising the first additional element A and at least one of a low-melting second additional element B selected from S, Se, Te, Sn, In, Ga, Pb, Bi, Zn, Al and Ag exist in the surroundings of the Si phase and the compound phase comprising Si and the first additional element A. As a result, since the low-melting second additional element B is a soft substance with a satisfactory electrical conductivity, the Si phase is to be covered with an intermetallic compound phase that is softer than the compound phase comprising of Si and the first additional element A, so as to doubly alleviate the stress caused by the volume expansion during the lithium absorption/desorption to/from Si. This provides an advantage that the intermetallic compound phase plays a role in preventing the collapse of the electrode and the electrical isolation of Si.

Additionally (or alternatively), when a compound phase comprising two or more of low-melting second additional elements B that are soft substances with satisfactory electrical conductivity and/or a single phase of the low-melting second additional element B exist so as to be dotted around or surround the Si phase, an intermetallic compound phase that is softer than the above intermetallic compound phases and/or a soft single metallic phase are formed so as to alleviate the stress caused by the volume expansion during the lithium absorption/desorption to/from Si with triple or quadruple structure (or double or triple structure). Moreover, the surfaces of the particles being dotted with the single phase of the low-melting element B provide an advantage that the low-melting element B improves particle-to-particle current collection performance and function as a volume expansion cushioning material between the particles in the case of expansion of the particles because the low-melting element B is a soft metal.

Further, enhancing adhesion with charge collectors such as Cu leads to an expectation of effects of improving the suppression of the electrode expansion or the charge-discharge cycle characteristics. In particular, in the case of containing an element having a melting point that is lower than a heating temperature at the time of electrode fabrication, partially forming metallic bonds between the particles and/or between the particles and the charge collectors such as Cu through melting or partial melting also leads to an expectation of effects of further improving the suppression of electrode expansion and the charge-discharge cycle characteristics.

Moreover, with regard to Si, too large Si phase size causes micronization of Si through repetition of a process such that reaction with lithium does not proceed to the inside of the Si phase but causes expansion from the surface layer which is easily reactable with lithium to generate cracks and subsequently the interior unreacted Si phase is expanded to cause cracks again. This allows the Si to be separated or detached from the electrode or to lose contact with the charge collectors, resulting in a sudden drop in charge-discharge capacity associated with cycles. Therefore, it is necessary to bring the fine structure to such a size that does not cause the micronization and, for this reason, Si preferably has an average minor axis width of 4 μm or less, preferably 2 μm or less, more preferably 1 μm or less and further preferably 500 nm or less. "Average minor axis width" refers to an average value of the thickness in thin width direction of the Si phase. Measurement of the average minor axis width may be conducted, for example, by polishing resin-embedded powder samples, randomly taking SEM Compo images of five particles with diameters of 40 μm or more on the cross section under a magnification of 4000, randomly reading five thicknesses in thin width direction of the Si phase from one sheet of the images, and calculating out the average value of the total of 25 read values.

The Si-based alloy anode material of the present invention preferably contains the first additional element A in an amount of 0.5 to 40 at %, more preferably 5 to 35 at %, further preferably 8 to 30 at % and particularly preferably 11 to 25 at %. That is, while one or more of the first additional element A selected from Ti, V, Cr, Mn, Fe, Co, Ni, Cu, Zr, Nb and Mg contributes to the mitigation of volume expansion of Si, the content of 0.5 at % or more makes it possible to easily alleviate the volume expansion of Si by preventing the Si content from becoming too large. Also, the content of the first additional element A being 40 at % or less makes it possible to provide a sufficient charge-discharge capacity by preventing the Si content from becoming too small.

The Si-based alloy anode material of the present invention preferably contains the second additional element B in an amount of 0.1 to 25 at %, more preferably 0.1 to 20 at %, further preferably 0.1 to 10 at % and particularly preferably 0.1 to 5 at %. This is because, since the low-melting second additional element B selected from S, Se, Te, Sn, In, Ga, Pb, Bi, Zn, Al and Ag may contributes to the mitigation of volume expansion of Si, the content of 0.1 at % or more makes it possible to easily alleviate the volume expansion of Si by preventing the Si content from becoming too large.

Also, the content of the second additional element B being 25 at % or less makes it possible to provide a sufficient charge-discharge capacity by preventing the Si content from becoming too small.

The Si-based alloy anode material of the present invention preferably contains the first additional element A and the second additional element B in a total amount of 12 to 25 at %, more preferably 13 to 24 at %, further preferably 14 to 23 at % and particularly preferably 15 to 22 at %. Setting the total amount to be 12 to 25 at % makes it possible to more stably fine the Si phase size, making it easier to provide satisfactory cycle life.

The Si-based alloy anode material of the present invention may contain at least Cu as the first additional element A in an amount of at least 0.5 to 75 at %, so that the first compound phase has a composition of $Si_xCu_y$ phase, provided x<y, and that the Si principal phase is surrounded by an intermetallic compound phase comprising $Si_xCu_y$ phase. That is, while Cu has superior electrical conductivity and extendability among the first additional element A and is an element which can most significantly alleviate the stress caused by the volume expansion of Si, the Cu content of 0.5 at % or more makes it possible to easily alleviate the stress caused by the volume expansion of Si by preventing the intermetallic compound phase from becoming too hard. Further, setting the Cu content to be 75 at % or less makes it possible to prevent decrease of charge-discharge capacity caused by an excessively small Si content. Namely, an intermetallic compound with superior electrical conductivity and stress alleviating ability can be formed by forming a Cu-rich compound which contains at least Cu as the first additional element A in an amount of 0.5 to 75 at % instead of a Si-rich compound.

Figure 1:
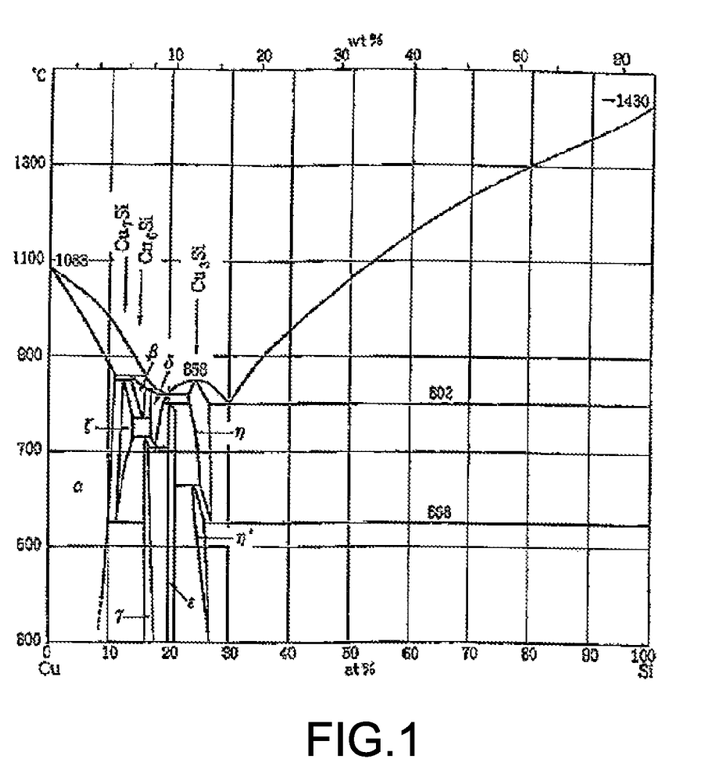
FIG. 1 is a Si—Cu binary phase diagram.

FIG. 1 is a Si—Cu binary phase diagram. As shown in FIG. 1, when Si—Cu molten alloy is cooled, Si begins to deposit as a primary crystal at the time of reaching a liquidus temperature (e.g. 1200° C. in the case of Si: 64 at %-Cu: 36 at %). When cooling rate is high as in a liquid quenching method or an atomizing method, the primary crystal deposits as a granular crystal, and then eutectic reaction of Si and $SiCu_3$ occurs at the time of reaching a solidus temperature (802° C.) to complete solidification. As described above, the phase diagram of Si-rich portion shows the eutectic reaction of Si phase and $SiCu_3$ phase with formation of structure in which Si phase is surrounded by $SiCu_3$ phase.

On the other hand, combination of elements for alloying Si and a metal other than Cu includes, for example, Fe—Si, Ni—Si, Mn—Si, Co—Si, Cr—Si, Si—W, Mo—Si, Nb—Si, Si—Ti, Si—V, and the like. However, these combinations result in leaving a composition that is richer in Si than metallic element, such as $FeSi_2$, $NiSi_2$, $CoSi_2$, $CrSi_2$, $WSi_2$, $MoSi_2$, $MnSi_2$, $NbSi_2$, $TiSi_2$, $VSi_2$.

Among the above combinations of Si and the transition elements, only Cu equilibrates with the Si phase as a metal-rich compound ($SiCu_3$). A measured resistance value of this Cu-rich compound ($SiCu_3$) is $16.3 \times 10^{-4}$ Ω·m, and it can be understood that $SiCu_3$ has a lower resistance value than the other silicide compounds: $FeSi_2$: $1,000 \times 10^{-4}$ Ω·m; $NiSi_2$: $50 \times 10^{-4}$ Ω·m; $CoSi_2$: $18 \times 10^{-4}$ Ω·m.

There are two factors for the lowest resistance value of $SiCu_3$. The first factor is that $SiCu_3$ has a composition richer in metal than the other silicide compounds. The second factor is that, in light of transition metal elements as a raw material, Cu single substance has an extremely low resistance value as compared to the other transition metal elements such as Cu: $1.73 \times 10^{-4}$ Ω·m; Fe: $10 \times 10^{-4}$ Ω·m; Ni: $11.8 \times 10^{-4}$ Ω·m; Co: $9.71 \times 10^{-4}$ Ω·m, that is, Si and Cu is a combination of Si and the transition metal which has the lowest resistance value.

As described above, the combination of Si and the transition metal element which has the lowest resistance value among transition metal silicide compounds is Si and Cu. This is because Cu single substance as a raw material of the transition metal silicide compounds has an extremely low resistance value as compared to the other single substances of transition metal element and makes it possible to form Si phase and a metal-rich compound phase comprising Si and Cu element ($Si_xCu_y$ (x<y)) such as $SiCu_3$ phase, which can never be obtained from the combination of Si and the other transition metal elements. Therefore, because of the lowest resistance value, it can be understood that $SiCu_3$ has a higher electrical conductivity than the above Si-rich intermetallic compounds ($FeSi_2$, $NiSi_2$, $CoSi_2$, $CrSi_2$, $WSi_2$, $MoSi_2$, $MnSi_2$, $NbSi_2$, $TiSi_2$, $VSi_2$).

In view of the above, it can be understood that, among the combinations of Si and the transition metal elements, only Cu causes deposition of the metal-rich compound ($SiCu_3$) phase and the Si phase by eutectic reaction, and that, in the case of $SiCu_3$, a structure in which the Si phase is surrounded by the $SiCu_3$ phase is formed in Si-rich compositions (e.g. Si: 64 atom %-Cu: 36 atom %) as shown in Si—Cu binary phase diagram. Therefore, depositing $SiCu_3$ phase, which has much higher electrical conductivity than the combinations of Si and the other transition metal elements, around the Si phase allows the $SiCu_3$ phase to play a role in supplementing poor electrical conductivity of Si. Furthermore, since the $SiCu_3$ phase has lower hardness than Si, it can function as a phase which alleviates the stress caused by large volume expansion/constriction of Si due to the reaction of Si with lithium.

Moreover, in the $Si_xCu_y$ alloy, which is an alloy of Cu which produces an intermetallic compound with Si, the composition of $Si_xCu_y$ phase needs to satisfies X<Y. For example, $FeSi_2$ cannot be Fe-rich. An alloy of Fe element and Si results in formation of a Si-rich compound phase, and thus has inferior electrical conductivity and cannot sufficiently play a role in preventing decrease in electrical conductivity between the Si phases caused by micronization of Si due to repetition of charging and discharging. It has thus been determined that the composition of $Si_xCu_y$ phase satisfies x<y. Preferably, x and y satisfy x=1 and y=3.

Furthermore, addition of the second additional element which is a low-melting element, such as S, Se, Te, Sn, In, Ga, Pb, Bi, Zn, Al and Ag, makes it possible (1) to further improve or enhance electrical conductivity of active material Si phase by synergistic effect of the $SiCu_3$ intermetallic compound and the low-melting element and (2) to alleviate the stress caused by volume change of Si during charging and discharging by the interaction of the $SiCu_3$ intermetallic compound phase and the low-melting element by virtue of the flexible low-melting element being distributed in a dotted manner, so that charge-discharge capacity and cycle life are both satisfactory, resulting in superior effects which enables provision of a secondary anode material. Further, when the Si principal phase has an average minor axis width of greater than 4 μm, the cycle life is deteriorated, and therefore the average minor axis width is 4 μm or less, preferably 2 μm or less, more preferably 1 μm or less and further preferably 500 nm or less.

Figure 2:
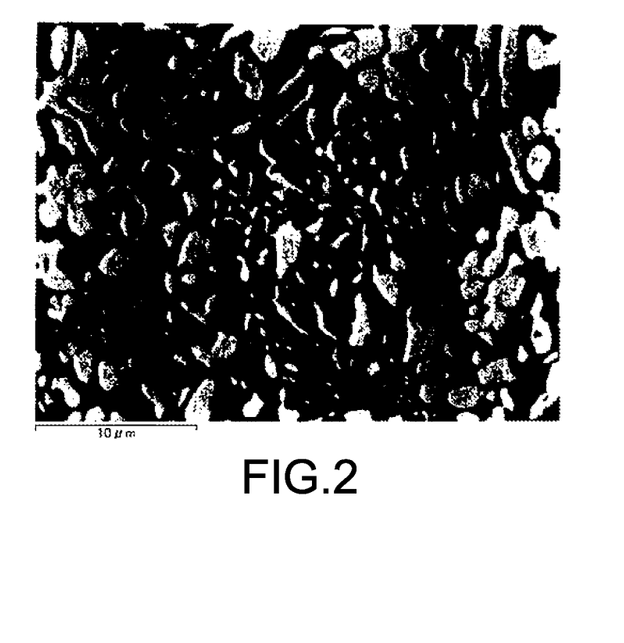
FIG. 2 is a cross-sectional SEM image of Si—$Si_2Cr$ eutectic alloy.

As another aspect, attention has been focused on microstructure. The feature thereof is to use Cr as an additional element for obtaining a eutectic alloy. FIG. 2 is a scanning electron microscope image of sectional structure of Si—Si$_2$Cr eutectic alloy according to the present invention. The black phase is Si phase, while the white phase is Si$_2$Cr phase. As shown in FIG. 2, the Si phase and the Si$_2$Cr phases are both extremely fine and have an average minor axis width of 1 μm or less. The cause of the fact that addition of Cr results in an extremely fine eutectic structure and superior charge-discharge properties, as compared to the other elements such as Fe and V, is presumed as follows.

The additional element content required for obtaining a eutectic of the Si phase and a silicide is determined by the kind of an element, and needs to be, for example, 26.5% in the case of Fe or 3% in the case of V. Each numerical value can be read from a phase diagram of Si and the additional element. In the case where a relatively large amount of an additional element is required for obtaining the eutectic, such as the case with Fe, the amount of silicide is inevitably large and tends to cause coarsening, so that the proportion of Si phase which absorbs/desorbes Li is lowered, failing to provide high discharge capacity.

On the other hand, in the case where an extremely small amount of an additional element is required for the eutectic, such as the case with V, the proportion of silicide in the eutectic structure is small, so that the Si phase inevitably tends to coarsen, failing to provide an effect of the silicide, which controls volume change of the Si phase during charging and discharging. Meanwhile, the Cr amount required for forming a eutectic is intermediate between the above amounts, and it is thus considered that the Si phase and the silicide are both fine. Therefore, the Si—Si$_2$Cr eutectic alloy can provide both high discharge capacity and superior cycle life.

Moreover, the charge-discharge properties can be further improved by replacing a part of the Cr with Ti. The inventors have examined the replacement of Cr with Ti in the Si—Si$_2$Cr eutectic alloy in detail, and thus considered that Ti replaces Cr of Si$_2$Cr to increase the lattice constant without changing the crystalline structure.

Figure 3:
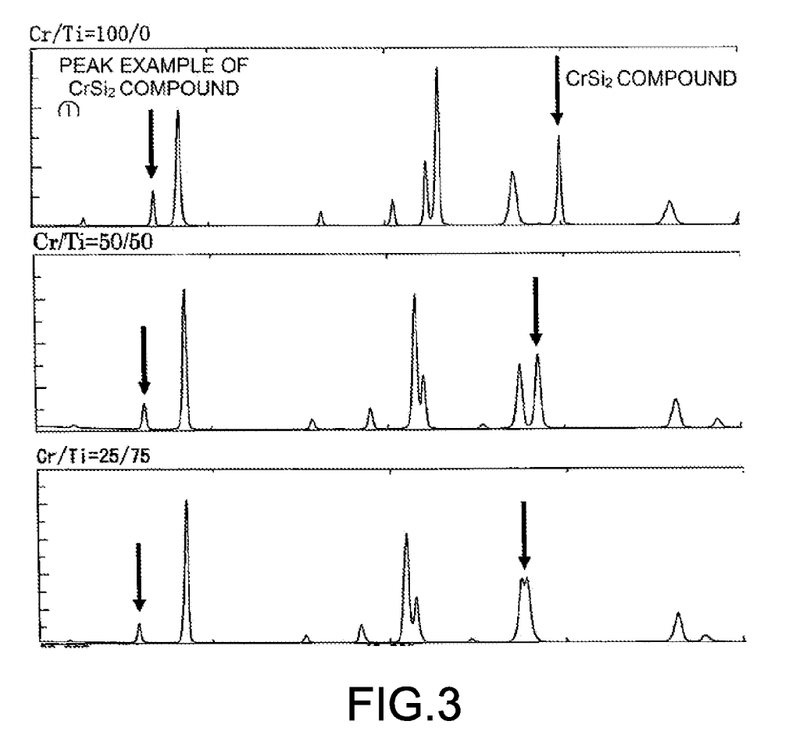
FIG. 3 is XRD patterns of Si—$Si_2Cr$ eutectic alloy, in which Cr/Ti ratio is varied.

FIG. 3 shows X-ray diffraction patterns of Si—Si$_2$Cr eutectic alloy in which Cr/Ti ratio is varied. As shown in FIG. 3, replacing a part of the Cr with Ti shifts the positions of diffraction peaks toward the lower angle side without changing the crystalline structure of Si$_2$Cr and, as a result, the lattice constant is considered to be increased.

The increase in the lattice constant of Si$_2$Cr by replacing Cr with Ti in the present invention is presumed to have a possibility of allowing Li to pass smoothly in the silicide and thus playing a role in mitigating volume change caused by the increase in the lattice constant. As described above, almost no research has been ever made to investigate into the structure of silicide, with regard to application of eutectic alloy of Si and silicide to a lithium ion battery anode active material.

Figure 4A:
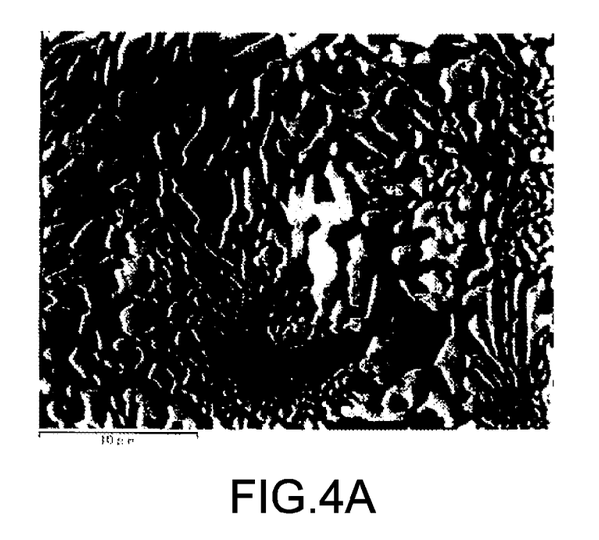
FIG. 4A is a SEM image of Si—$Si_2Cr$ eutectic alloy of which the total content of Cr and Ti is varied to be 17%.
Figure 4B:
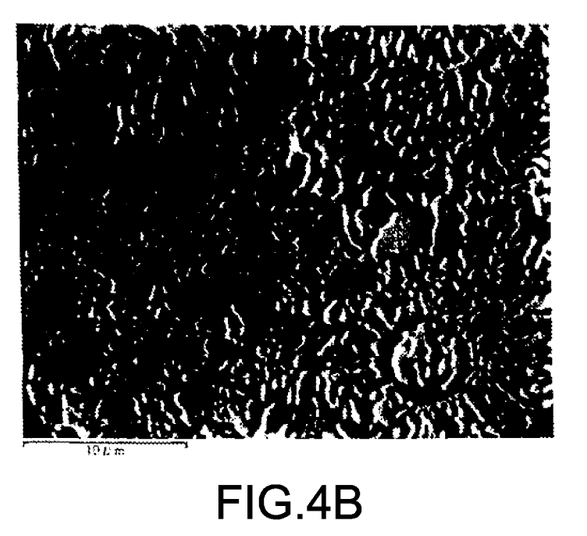
FIG. 4B is a SEM image of Si—$Si_2Cr$ eutectic alloy of which the total content of Cr and Ti is varied to be 19%.

Furthermore, the effect of replacing a part of Cr with Ti has been found to have an unexpected advantage as mentioned below, although the detailed cause is uncertain. Ordinary eutectic structure is a specific structure having a one single amount of an additional element, so that even slight deviation from the additional element amount results in hypoeutectic or hypereutectic alloy, which causes crystallization of a significantly coarse primary crystal. Accordingly, in order to obtain the eutectic structure precisely, advanced production technique is required. However, in the case of the alloy of the present invention in which a part of the Cr is replaced with Ti, fine structure can be obtained in the wide range of the total content of Cr and Ti approximately around 12 to 21%, so that slight deviation from the additional element amount due to production lots does not bring severe structural change. FIGS. 4A and 4B are scanning electron microscope images of sectional structure of Si—Si$_2$Cr eutectic alloy, in which the total content of Cr and Ti is varied. FIG. 4A represents a case where the total content of Cr and Ti is 17%, while FIG. 4B represents a case where the total content of Cr and Ti is 19%.

Further, addition of a low-melting element, such as S, Se, Te, Sn, In, Ga, Pb, Bi, Zn, Al and Ag, to the above Si—Si$_2$(Cr, Ti) eutectic alloy, makes it possible (1) to further improve or enhance electrical conductivity of active material Si phase by synergistic effect of the intermetallic compound such as Si$_2$(Cr, Ti) and the low-melting element and (2) to alleviate the stress caused by volume change of Si during charging and discharging by the interaction of the intermetallic compound phase such as Si—Si$_2$(Cr, Ti) and the low-melting element by virtue of the flexible low-melting element being distributed in a dotted manner, so that charge-discharge capacity and cycle life are both satisfactory, resulting in superior effects which enable provision of a secondary anode material.

Furthermore, replacing a part of the Cr with one or more of Ti, Mn, Fe, Ni and Cu and adding a low-melting second additional element B, such as S, Se, Te, Sn, In, Ga, Pb, Bi, Zn, Al and Ag, makes it possible (1) to further improve or enhance electrical conductivity of active material Si phase by synergistic effect of the intermetallic compound such as Si—Si$_2$ (Cr, Ti) and the low-melting element and (2) to alleviate the stress caused by volume change of Si during charging and discharging by the interaction of the intermetallic compound phase such as Si$_2$(Cr, Ti) and the low-melting element by virtue of the flexible low-melting element being distributed in a dotted manner, so that charge-discharge capacity and cycle life are both satisfactory, resulting in superior effects which enable provision of a secondary anode material. Further, when the Si principal phase has an average minor axis width of greater than 4 μm, cycle life is deteriorated, and therefore the average minor axis width is 4 μm or less, preferably 2 μm or less, more preferably 1 μm or less and further preferably 500 nm or less.

Preferably, the Si-based alloy anode material may contain at least Cr and Ti as the first additional element A in a total amount of 12 to 21 at %, which includes Ti amount being 0 at %, and Cr %/(Cr %+Ti %) ratio may be 0.15 to 1.00. Namely, in the alloy of the present invention, Cr is an essential element for producing Si$_2$Cr which forms fine eutectic structure with the Si phase, and Ti is an effective element which replaces Cr to increase the lattice constant of Si$_2$Cr. The total amount of Cr and Ti of less than 12% results in hypoeutectic structure to crystallize a coarse primary crystal Si phase, while the total amount of greater than 21% results in hypereutectic structure to crystallize coarse Si$_2$Cr, leading to deterioration of cycle life in both cases. Further, when the Cr %/(Cr %+Ti %) ratio is less than 0.15, Si$_2$Ti phase is produced in addition to the Si$_2$Cr phase and, moreover, the Si phase is coarsened and cycle life is deteriorated. The total amount of Cr and Ti is preferably in the range of 17 to 20 at %, more preferably 18 to 19 at %. Further, the Cr %/(Cr %+Ti %) ratio is preferably in the range of 0.15 to 0.90, more preferably 0.20 to 0.80.

Because of the eutectic alloy, solidification structure formed at cooling rate of 100° C./s or more is preferable. The microstructure size of the eutectic alloy is generally affected by the cooling rate. Solidification methods at solidification rate of 100° C./s or more include a gas atomizing method, a disc-atomizing method, a single-roll method and the like. The gas atomizing method or the disc-atomizing method is preferable.

In the Si-based alloy anode material, the Si principal phase preferably has amorphous structure. This is because the amorphous structure enables suppression of the expansion and prevention of the micronization by virtue of an improved strength of the Si phase and the like, allowing lithium insertion/elimination reaction to proceed efficiently so as to improve charging-discharging performances.

The method for producing the above-mentioned alloy powder may be any process, such as water atomizing, gas atomizing, disc-atomizing, centrifugal atomizing, quenching roll, mechanical milling, mechanical alloying and blending method, and any combination thereof.

Further, the anode material for lithium ion secondary batteries of the present invention exhibits satisfactory performance in charge-discharge capacity and cycle life since improvement of electrical conductivity and mitigation of expansion can be attained by applying the stress caused by volume change of Si during charging and discharging to the interaction between the intermetallic compound phase and the low-melting element and by using carbon by mixture.

Preferably, the Si-based alloy anode material of the present invention may contain one or more being selected from the group consisting of Sn, Cu and Bi in a total amount of 0.1 to 5 at %. For example, the Si-based alloy anode material of the present invention preferably contains Sn in an amount of 0.1 to 3 at %. Alternatively, the Si-based alloy anode material of the present invention preferably contains Bi in an amount of 0.1 to 3 at %.

EXAMPLES

The present invention will be specifically described with reference to the following examples.

Anode material powders with the compositions shown in Table 1 were prepared by a single-roll method, a gas atomizing method or a disc-atomizing method as described below. In a liquid quenching method which is the single-roll method, a raw material with the predetermined composition was put into a silica tube with pores at the bottom, and then subjected to high frequency melting in Ar atmosphere to form molten metal, which was tapped onto the surface of a rotating copper roll, of which quenching effect was utilized to prepare quenched ribbons having an amorphous Si phase formed therein. The quenched ribbons thus prepared were put into a pot made of zirconia with zirconia balls and then sealed in Ar atmosphere, followed by pulverization by mechanical milling.

In the gas atomizing method, a raw material with the predetermined composition was put into a silica crucible with pores at the bottom, and subjected to heat melting in Ar gas atmosphere in a high-frequency induction smelting furnace to form molten metal, which was then tapped upon gas jetting in Ar gas atmosphere and thus rapidly-solidified to obtain an intended gas atomized impalpable powder. In the disc-atomizing method, a raw material with the predetermined composition was put into a silica crucible with pores at the bottom, and subjected to heat melting in Ar gas atmosphere in a high-frequency induction smelting furnace to form molten metal, which was then tapped onto a rotating disc at 40000 to 60000 r.p.m. in Ar gas atmosphere and thus rapidly-solidified to obtain an intended disc-atomized impalpable powder.

In order to evaluate electrode performances of the anode as a single electrode, a two-electrode coin-type cell with a counter electrode made from lithium metal was used. First of all, an anode active material (Si—Cu, Si—Cr—Ti or the like), a conductive material (acetylene black) and a binding material (polyvinylidene fluoride) were weighed with an electric balance, and then mixed with a dispersion liquid (N-methylpyrrolidone) to provide a mixed slurry, which was applied uniformly onto a charge collector (Cu foil). After the application, the solvent was evaporated by drying under reduced pressure with a vacuum drier to provide a coated charge collector, which was then roll-pressed as needed and thereafter stamped out into a shape adapted to the coin-type cell. Similarly, for the lithium counter electrode, a metal lithium foil was stamped out into a shape adapted to the coin-type cell.

An electrolyte used for a lithium ion battery was prepared by using a mixed solvent comprising ethylene carbonate and dimethyl carbonate in the ratio of 3:7 and dissolving a supporting electrolyte $LiPF_6$ (lithium hexafluorophosphate) in an amount of 1 mol with respect to the electrolyte. Since the electrolyte needed to be dealt with carefully in an inert atmosphere of which the dew point was controlled, all process of assembling the cell was carried out in a glove box under the inert atmosphere. A separator was cut out into a shape adapted to the coin-type cell and held in the electrolyte under vacuum for several hours in order to allow the electrolyte to sufficiently permeate the separator. Thereafter, the anode which was stamped out in the previous step, the separator and the lithium counter electrode were combined in this order to construct a cell of which the inside was sufficiently filled with the electrolyte.

The measurement of charge capacity and discharge capacity was performed with the above two-electrode cell at 25° C. The charge was carried out at a current density of 0.50 mA/cm$^2$ to reach the same electric potential as that of the metal lithium electrode (0V) while the discharge was carried out at the same current value (0.50 mA/cm$^2$) to reach 1.5 V, and this charge/discharge cycle was defined as 1 cycle. Further, for the evaluation of cycle life, the above measurement was repeated.

TABLE 1

| | Additional element A (at. %) | | | | | | | | | | | Additional element B (at. %) | | | | | | | | | | at. % |
|---|---|---|---|---|---|---|---|---|---|---|---|---|---|---|---|---|---|---|---|---|---|---|
| No. | Ti | V | Cr | Mn | Fe | Co | Ni | Cu | Zr | Nb | Mg | S | Se | Te | Sn | In | Ga | Pb | Bi | Zn | Al | Ag | Si |
| 1 | 0 | 0 | 0 | 0 | 0 | 0 | 0 | 31.0 | 0 | 0 | 0 | 0 | 0 | 0 | 5.0 | 0 | 0 | 0 | 0 | 0 | 0 | 0 | balance |
| 2 | 5.0 | 0 | 0 | 0 | 0 | 0 | 0 | 31.0 | 0 | 0 | 0 | 0 | 0 | 0 | 5.0 | 0 | 0 | 0 | 0 | 0 | 0 | 0 | balance |
| 3 | 3.0 | 0 | 3.0 | 0 | 0 | 0 | 0 | 25.0 | 0 | 0 | 0 | 0 | 0 | 0 | 0 | 0 | 0 | 0 | 3.0 | 0 | 0 | 0 | balance |
| 4 | 3.0 | 3.0 | 3.0 | 0 | 0 | 0 | 0 | 20.0 | 0 | 0 | 0 | 0 | 0 | 0 | 1.0 | 0 | 0 | 0 | 2.0 | 1.0 | 0 | 0 | balance |
| 5 | 0 | 0 | 0 | 2.0 | 2.0 | 3.0 | 1.0 | 15.0 | 0 | 0 | 0 | 1.0 | 2.0 | 0 | 3.0 | 0 | 2.0 | 2.0 | 0 | 0 | 2.0 | balance |
| 6 | 4.0 | 0 | 4.0 | 0 | 0 | 0 | 0 | 30.0 | 0 | 0 | 0 | 0 | 0 | 0 | 3.0 | 0 | 0 | 0 | 2.0 | 2.0 | 1.0 | 0 | balance |
| 7 | 3.0 | 0 | 2.0 | 1.0 | 1.0 | 1.0 | 1.0 | 25.0 | 1.0 | 1.0 | 1.0 | 0 | 0 | 0 | 2.0 | 1.0 | 0 | 0 | 1.0 | 1.0 | 1.0 | 1.0 | balance |
| 8 | 1.0 | 0 | 2.0 | 0 | 0 | 0 | 0 | 10.0 | 1.0 | 1.0 | 2.0 | 0 | 2.0 | 1.0 | 1.0 | 0 | 2.0 | 0 | 1.0 | 0 | 0 | 2.0 | balance |
| 9 | 2.0 | 4.0 | 0 | 3.0 | 4.0 | 0 | 1.0 | 20.0 | 0 | 2.0 | 0 | 1.0 | 1.0 | 0 | 1.0 | 1.0 | 0 | 1.0 | 3.0 | 0 | 0 | 2.0 | balance |

TABLE 1-continued

| No. | C1 | C2 | C3 | C4 | C5 | C6 | C7 | C8 | C9 | C10 | C11 | C12 | C13 | C14 | C15 | C16 | C17 | C18 | C19 | C20 | C21 | C22 | |
|---|---|---|---|---|---|---|---|---|---|---|---|---|---|---|---|---|---|---|---|---|---|---|---|
| 10 | 2.0 | 1.0 | 3.0 | 1.0 | 3.0 | 0 | 2.0 | 11.0 | 0 | 3.0 | 0 | 2.0 | 1.0 | 0 | 0 | 1.0 | 0 | 2.0 | 1.0 | 1.0 | 1.0 | 1.0 | balance |
| 11 | 2.0 | 2.0 | 1.0 | 3.0 | 1.0 | 4.0 | 3.0 | 25.0 | 3.0 | 0 | 0 | 2.0 | 1.0 | 1.0 | 1.0 | 2.0 | 2.0 | 1.0 | 1.0 | 2.0 | 15.0 | 2.0 | balance |
| 12 | 3.0 | 2.0 | 4.0 | 5.0 | 1.0 | 3.0 | 2.0 | 9.0 | 1.0 | 0 | 3.0 | 1.0 | 0 | 3.0 | 0 | 1.0 | 1.0 | 1.0 | 1.0 | 15.0 | 1.0 | 2.0 | balance |
| 13 | 2.0 | 3.0 | 2.0 | 2.0 | 1.0 | 2.0 | 1.0 | 25.0 | 2.0 | 2.0 | 4.0 | 1.0 | 2.0 | 1.0 | 1.0 | 1.0 | 2.0 | 3.0 | 2.0 | 1.0 | 1.0 | 2.0 | balance |
| 14 | 1.0 | 2.0 | 1.0 | 1.0 | 1.0 | 2.0 | 0 | 40.0 | 0 | 0 | 0 | 0 | 0 | 0 | 2.0 | 0 | 0 | 0 | 2.0 | 1.0 | 0 | 0 | balance |
| 15 | 2.0 | 1.0 | 2.0 | 0 | 2.0 | 0 | 1.0 | 25.0 | 0 | 0 | 0 | 0 | 0 | 0 | 5.0 | 1.0 | 0 | 0 | 5.0 | 0 | 0 | 1.0 | balance |
| 16 | 0 | 0 | 0 | 0 | 0 | 0 | 0 | 26.0 | 0 | 0 | 0 | 0 | 0 | 0 | 0 | 0 | 0 | 0 | 5.0 | 0 | 0 | 0 | balance |
| 17 | 0 | 0 | 0 | 0 | 0 | 0 | 0 | 21.0 | 0 | 0 | 0 | 0 | 0 | 0 | 5.0 | 0 | 0 | 0 | 5.0 | 0 | 0 | 0 | balance |
| 18 | 0 | 0 | 0 | 0 | 0 | 0 | 0 | 26.0 | 0 | 0 | 0 | 0 | 0 | 0 | 2.0 | 0 | 0 | 0 | 3.0 | 2.0 | 0 | 0 | balance |
| 19 | 0 | 0 | 0 | 0 | 0 | 0 | 0 | 25.0 | 0 | 0 | 0 | 0 | 0 | 0 | 2.0 | 0 | 0 | 0 | 2.0 | 2.0 | 0 | 0 | balance |
| 20 | 10.0 | 0 | 0 | 6.0 | 0 | 0 | 0 | 0 | 0 | 0 | 0 | 0 | 0 | 0 | 1.0 | 0 | 0 | 0 | 0 | 0 | 0 | 0 | balance |
| 21 | 9.5 | 0 | 7.5 | 0 | 0 | 0 | 0 | 0 | 0 | 0 | 0 | 0 | 0 | 0 | 1.0 | 0 | 0 | 0 | 0 | 0 | 0 | 0 | balance |
| 22 | 9.5 | 0 | 9.5 | 0 | 0 | 0 | 0 | 0 | 0 | 0 | 0 | 0 | 0 | 0 | 0 | 0 | 0 | 0 | 1.0 | 0 | 0 | 0 | balance |
| 23 | 13.0 | 0 | 7.0 | 0 | 0 | 0 | 0 | 0 | 0 | 0 | 0 | 0 | 0 | 0 | 1.0 | 0 | 0 | 0 | 0 | 0 | 0 | 0 | balance |
| 24 | 16.0 | 0 | 0 | 0 | 0 | 0 | 0 | 0 | 0 | 0 | 0 | 0 | 0 | 0 | 1.0 | 0 | 0 | 0 | 0 | 0 | 0 | 0 | balance |
| 25 | 6.0 | 0 | 9.0 | 0 | 0 | 0 | 0 | 0 | 0 | 0 | 0 | 0 | 0 | 0 | 0 | 0 | 0 | 0 | 0 | 0 | 4.0 | 0 | balance |
| 26 | 9.0 | 0 | 4.0 | 0 | 0 | 0 | 0 | 0 | 0 | 0 | 0 | 0 | 0 | 0 | 1.0 | 0 | 0 | 0 | 0 | 0 | 7.0 | 0 | balance |
| 27 | 9.0 | 0 | 9.0 | 0 | 0 | 0 | 0 | 0 | 0 | 0 | 0 | 0 | 0 | 0 | 1.0 | 0 | 0 | 0 | 1.0 | 0 | 0 | 0 | balance |
| 28 | 12.0 | 0 | 0 | 4.0 | 2.0 | 0 | 0 | 0 | 0 | 0 | 0 | 0 | 0 | 0 | 1.0 | 0 | 0 | 0 | 0 | 0 | 0 | 0 | balance |
| 29 | 13.5 | 0 | 2.5 | 0 | 2.0 | 0 | 0 | 0 | 0 | 0 | 0 | 0 | 0 | 0 | 1.0 | 0 | 0 | 0 | 0 | 0 | 0 | 0 | balance |
| 30 | 8.3 | 0 | 7.7 | 0 | 0 | 2.0 | 0 | 0 | 0 | 0 | 0 | 0 | 0 | 0 | 1.0 | 0 | 0 | 0 | 0 | 0 | 0 | 0 | balance |
| 31 | 4.0 | 0 | 12.0 | 0 | 0 | 0 | 2.0 | 0 | 0 | 0 | 0 | 0 | 0 | 0 | 1.0 | 0 | 0 | 0 | 0 | 0 | 0 | 0 | balance |
| 32 | 2.0 | 0 | 14.0 | 1.0 | 1.0 | 0 | 0 | 0 | 0 | 0 | 0 | 0 | 0 | 0 | 1.0 | 0 | 0 | 0 | 0 | 0 | 0 | 0 | balance |
| 33 | 1.0 | 0 | 15.0 | 0 | 1.0 | 0 | 1.0 | 0 | 0 | 0 | 0 | 0 | 0 | 0 | 1.0 | 0 | 0 | 0 | 0 | 0 | 0 | 0 | balance |
| 34 | 5.5 | 0 | 10.5 | 0.5 | 0.5 | 0 | 0.5 | 0.5 | 0 | 0 | 0 | 0 | 0 | 0 | 1.0 | 0 | 0 | 0 | 0 | 0 | 0 | 0 | balance |
| 35 | 6.0 | 0 | 6.0 | 1.0 | 0 | 0 | 0 | 0 | 0 | 0 | 0 | 0 | 0 | 0 | 0.1 | 0 | 0 | 0 | 0 | 0 | 0 | 0 | balance |
| 36 | 9.5 | 0 | 9.5 | 0 | 0 | 0 | 0 | 0 | 0 | 0 | 0 | 0 | 0 | 0 | 0.5 | 0 | 0 | 0 | 0 | 0 | 0 | 0 | balance |
| 37 | 9.0 | 0 | 9.0 | 0 | 0 | 0 | 2.0 | 0 | 0 | 0 | 0 | 0 | 0 | 0 | 1.0 | 0 | 0 | 0 | 0 | 0 | 0 | 0 | balance |
| 38 | 0 | 0 | 15.0 | 0 | 0 | 0 | 0 | 0 | 0 | 0 | 0 | 0 | 0 | 0 | 0 | 0 | 0 | 0 | 1.0 | 0 | 0 | 0 | balance |
| 39 | 0 | 0 | 15.0 | 0 | 0 | 0 | 0 | 0 | 0 | 0 | 0 | 0 | 0 | 0 | 0.5 | 0 | 0 | 0 | 0 | 0 | 0 | 0 | balance |

| No. | Si average minor axis width (μm) | Notes Value of Cr %/(Cr % + Ti %) | Initial discharge capacity (mAh/g) | Discharge capacity retention rate after 50 cyclic operations (%) |
|---|---|---|---|---|
| 1 | 0.9 | | 1432 | 53 |
| 2 | 2.4 | | 1632 | 61 |
| 3 | 0.6 | | 1389 | 69 |
| 4 | 3.1 | | 1623 | 72 |
| 5 | 2.8 | | 1262 | 81 |
| 6 | 0.8 | | 1244 | 80 |
| 7 | 0.3 | | 1345 | 92 |
| 8 | 1.5 | | 1452 | 76 |
| 9 | 1.7 | | 1245 | 69 |
| 10 | 0.7 | | 1324 | 57 |
| 11 | 3.2 | | 1128 | 79 |
| 12 | 0.3 | | 1438 | 92 |
| 13 | 3.6 | | 1466 | 84 |
| 14 | 1.2 | | 1536 | 78 |
| 15 | 0.8 | | 1642 | 91 |
| 16 | 0.6 | | 1532 | 84 |
| 17 | 1.0 | | 1678 | 77 |
| 18 | 1.5 | | 1254 | 80 |
| 19 | 1.8 | | 1189 | 90 |
| 20 | 1.0 | 0.38 | 1385 | 67 |
| 21 | 2.1 | 0.44 | 1497 | 74 |
| 22 | 1.1 | 0.50 | 1276 | 62 |
| 23 | 1.3 | 0.35 | 1380 | 59 |
| 24 | 2.4 | | 1264 | 62 |
| 25 | 0.6 | | 1462 | 64 |
| 26 | 3.1 | | 1432 | 78 |
| 27 | 2.3 | 0.50 | 1293 | 89 |
| 28 | 2.1 | 0.25 | 1329 | 73 |
| 29 | 1.2 | 0.16 | 1267 | 68 |
| 30 | 3.1 | 0.48 | 1282 | 67 |
| 31 | 1.7 | 0.75 | 1429 | 87 |
| 32 | 0.9 | 0.88 | 1594 | 58 |
| 33 | 2.1 | 0.94 | 1623 | 63 |
| 34 | 1.1 | 0.66 | 1523 | 77 |
| 35 | 0.8 | 0.50 | 1425 | 67 |
| 36 | 0.2 | 0.50 | 1439 | 75 |
| 37 | 0.3 | 0.50 | 1348 | 89 |
| 38 | 0.7 | 1.00 | 1392 | 80 |
| 39 | 0.8 | 1.00 | 1298 | 74 |

TABLE 2

| | Additional element A (at. %) | | | | | | | | | | | Additional element B (at. %) | |
|---|---|---|---|---|---|---|---|---|---|---|---|---|---|
| No. | Ti | V | Cr | Mn | Fe | Co | Ni | Cu | Zr | Nb | Mg | S | Se |
| 40 | 11.0 | 0 | 0 | 0 | 0 | 0 | 0 | 31.0 | 0 | 0 | 0 | 0 | 0 |
| 41 | 5.0 | 0 | 0 | 0 | 0 | 0 | 0 | 31.0 | 0 | 0 | 0 | 0 | 0 |
| 42 | 3.0 | 5.0 | 3.0 | 0 | 0 | 0 | 10.0 | 20.0 | 0 | 0 | 0 | 0 | 0 |
| 43 | 3.0 | 3.0 | 3.0 | 0 | 2.0 | 0 | 0 | 10.0 | 0 | 0 | 0 | 0 | 0 |
| 44 | 0 | 0 | 0 | 0 | 0 | 0 | 0 | 0 | 0 | 0 | 0 | 0 | 0 |
| 45 | 0 | 0 | 0 | 0 | 0 | 0 | 0 | 0 | 0 | 0 | 0 | 0 | 1.0 |
| 46 | 0 | 0 | 0 | 0 | 0 | 0 | 0 | 0 | 0 | 0 | 0 | 0 | 0 |
| 47 | 0 | 0 | 0 | 0 | 0 | 0 | 0 | 0 | 0 | 0 | 0 | 0 | 0 |
| 48 | 0 | 0.1 | 0 | 0 | 0 | 0 | 0 | 0 | 0.1 | 0 | 0 | 0 | 0 |
| 49 | 1.0 | 0 | 0 | 2.0 | 0 | 2.0 | 0 | 20.0 | 0 | 0 | 1.0 | 0 | 0 |
| 50 | 0 | 0.1 | 0 | 0 | 0 | 0.2 | 0 | 0 | 0 | 0 | 0 | 0 | 1.0 |
| 51 | 0 | 0 | 0 | 1.0 | 3.0 | 1.0 | 1.0 | 25.0 | 0 | 0 | 0 | 0 | 0 |
| 52 | 0.1 | 0 | 0 | 0 | 0 | 0 | 0 | 0.3 | 0 | 0 | 0 | 0 | 0 |
| 53 | 0 | 21.0 | 0 | 0 | 0 | 0 | 0 | 21.0 | 0 | 0 | 0 | 0 | 0 |
| 54 | 0.1 | 1.0 | 1.0 | 1.0 | 1.0 | 2.0 | 0 | 25.0 | 0 | 0 | 0 | 0 | 0 |
| 55 | 0 | 35.0 | 0 | 0 | 10.0 | 0 | 0 | 0 | 0 | 0 | 0 | 0 | 0 |

| | Additional element B (at. %) | | | | | | | | | at. % |
|---|---|---|---|---|---|---|---|---|---|---|
| No. | Te | Sn | In | Ga | Pb | Bi | Zn | Al | Ag | Si |
| 40 | 0 | 0 | 0 | 0 | 0 | 0 | 0 | 0 | 0 | balance |
| 41 | 0 | 0 | 0 | 0 | 0 | 0 | 0 | 0 | 0 | balance |
| 42 | 0 | 0 | 0 | 0 | 0 | 0 | 0 | 0 | 0 | balance |
| 43 | 0 | 0 | 0 | 0 | 0 | 0 | 0 | 0 | 0 | balance |
| 44 | 0 | 3.0 | 9.0 | 3.0 | 0 | 9.0 | 0 | 6.0 | 0 | balance |
| 45 | 2.0 | 0 | 3.0 | 0 | 2.0 | 2.0 | 0 | 0 | 2.0 | balance |
| 46 | 0 | 0 | 0 | 0 | 0 | 0.2 | 0 | 0 | 0 | balance |
| 47 | 0 | 0.05 | 0 | 0 | 0 | 0 | 0 | 0 | 0 | balance |
| 48 | 0 | 0 | 0 | 0 | 0.1 | 0 | 0 | 0 | 0 | balance |
| 49 | 0 | 3.0 | 3.0 | 4.0 | 0 | 0 | 1.0 | 0 | 0 | balance |
| 50 | 2.0 | 0 | 3.0 | 0 | 1.0 | 2.0 | 0 | 1.0 | 0 | balance |
| 51 | 0 | 0 | 0 | 0.2 | 0 | 0 | 0 | 0 | 0 | balance |
| 52 | 0 | 0 | 0 | 0.04 | 0 | 0 | 0 | 0 | 0 | balance |
| 53 | 0 | 0 | 0 | 2.0 | 1.0 | 3.0 | 1.0 | 0 | 0 | balance |
| 54 | 0 | 0 | 1.0 | 0 | 24.0 | 1.0 | 0 | 1.0 | 0 | balance |
| 55 | 0 | 0 | 20.0 | 10.0 | 0 | 0 | 0 | 0 | 0 | balance |

| No. | Si average minor axis width (μm) | Notes Value of Cr %/ (Cr % + Ti %) | Initial discharge capacity (mAh/g) | Discharge capacity retention rate after 50 cyclic operations (%) |
|---|---|---|---|---|
| 40 | 1.3 | | 1293 | 21 |
| 41 | 2.4 | | 923 | 13 |
| 42 | 6.6 | | 941 | 32 |
| 43 | 5.6 | | 839 | 12 |
| 44 | 8.3 | | 996 | 23 |
| 45 | 2.8 | | 823 | 31 |
| 46 | 1.5 | | 704 | 22 |
| 47 | 5.5 | | 999 | 28 |
| 48 | 4.5 | | 792 | 10 |
| 49 | 5.4 | | 589 | 23 |
| 50 | 9.4 | | 627 | 27 |
| 51 | 4.4 | | 472 | 15 |
| 52 | 6.3 | | 632 | 18 |
| 53 | 8.4 | | 834 | 27 |
| 54 | 6.2 | | 934 | 37 |
| 55 | 8.7 | | 763 | 13 |

Note)
Underline indicates failure to satisfy the requirements of the present invention.

Nos. 1 to 39 are examples of the present invention as shown in Table 1, while Nos. 40 to 55 are comparative examples as shown in Table 2. Initial discharge capacity and discharge capacity retention rate after 50 cyclic operations are shown as the characteristics.

Nos. 1 to 39, which are examples of the present invention, had a principal phase comprising Si to which a first additional element A being at least one selected from Ti, V, Cr, Mn, Fe, Co, Ni, Cu, Zr, Nb and Mg and a low-melting additional element B being at least one selected from S, Se, Te, Sn, In, Ga, Pb, Bi, Zn, Al and Ag, were added. The low-melting element, such as S, Se, Te, Sn, In, Ga, Pb, Bi, Zn, Al and Ag, was distributed in a dotted manner in an intermetallic compound phase. It was thereby possible (1) to further improve or enhance electrical conductivity of active material Si phase by synergistic effect of the intermetallic compound and the low-melting element and (2) to further alleviate the stress caused by volume change of Si during charging and discharging by the interaction of the intermetallic compound phase and the low-melting element by virtue of the flexible low-melting element B being distributed in a dotted manner, so that charge-discharge capacity and cycle life were both satisfactory. Further, superior performances are determined on the basis of discharge capacity of 1000 mAh/g or more and cycle life (discharge capacity retention rate after 50 cyclic operations (%)) of 60% or more.

For example, in No. 11, the alloy phase is composed of a principal phase comprising Si and a compound phase comprising two or more of elements. The elements for constituting the above compound phase are a first additional element A of Ti, V, Cr, Mn, Fe, Co, Ni, Cu, and/or Zr; and a low-melting element B of S, Se, Te, Sn, In, Ga, Pb, Bi, Zn, Al and/or Ag. The compound phase comprises a first compound phase comprising Si and the first additional element A and a second compound phase comprising the first additional element A and the second additional element B, as well as one or both of a third compound phase comprising two or more of the second additional elements B and a single phase of the second additional element B. Si serving as the principal phase has an average minor axis width of 4 µm or less. Therefore, No. 11 satisfies the requirements of the present invention and exhibited satisfactory performances both in charge-discharge capacity and cycle life, such that the discharge capacity was 1128 mAh/g and the discharge capacity retention rate after 50 cyclic operations was 79%.

In No. 3, the alloy phase is composed of a principal phase comprising Si and a compound phase comprising two or more of elements. The elements for constituting the above compound phase are the first additional element A of Ti, Cr and/or Cu; and the low-melting element B of Bi. The above compound phase comprises a compound phase comprising Si and the first additional element A; and a single phase of the second additional element B. Si serving as the principal phase has an average minor axis width of 4 µm or less. Therefore, No. 3 satisfies the requirements of the present invention and exhibited satisfactory performances both in charge-discharge capacity and cycle life, such that the discharge capacity was 1389 mAh/g and the discharge capacity retention rate after 50 cyclic operations was 69%.

In No. 12, the content of one or more of the first additional element A is 33 at %, falling within the range of 0.5 to 40 at %. Therefore, No. 12 satisfies the requirements of the present invention and exhibited satisfactory performances both in charge-discharge capacity and cycle life. In No. 13, the content of one or more of the low-melting second additional element B is 17 at %, falling within the range of 0.1 to 25 at %. Therefore, No. 13 satisfies the conditions of the present invention and exhibited satisfactory performances both in charge-discharge capacity and cycle life, such that the discharge capacity was 1438 mAh/g and the discharge capacity retention rate after 50 cyclic operations was 92%.

In No. 20, the total content of the first additional element A and the low-melting second additional element B is particularly 17 at %, falling within the range of 12 to 25 at %. Therefore, No. 20 satisfies the requirements of the present invention and exhibited satisfactory performances both in charge-discharge capacity and cycle life. In No. 14, the content of Cu as the first additional element A is 40 at %, falling within the range of 0.5 to 75 at %. In the first compound phase, X and Y satisfies X<Y in the composition of $Si_XCu_Y$ phase and a Si phase is surrounded by an intermetallic compound phase comprising $Si_XCu_Y$ phase. Therefore, No. 14 satisfies the requirements of the present invention and exhibited satisfactory performances both in charge-discharge capacity and cycle life, such that the discharge capacity was 1385 mAh/g and the discharge capacity retention rate after 50 cyclic operations was 67%.

In No. 27, the content of Cr is 9.0 at % and the content of Ti is 9.0 at %, as the first additional element A. The total content of Cr and Ti is 18 at %, falling within the range of 12 to 21 at %. Cr %/(Cr %+Ti %) is also 0.50, falling within the range of 0.15 to 1.00. Therefore, No. 27 satisfies the requirements of the present invention and exhibited satisfactory performances both in charge-discharge capacity and cycle life, such that the discharge capacity was 1293 mAh/g and the discharge capacity retention rate after 50 cyclic operations was 89%.

These also contain one or more of the first additional element A in an amount of 0.5 to 40 at % and one or more of the low-melting second additional element B in an amount of 0.1 to 25 at %, with Si principal phase having an average minor axis width of 4 µm or less, satisfying the requirements of the present invention. Comparative Examples 40 and 41 do not contain the low-melting element B, failing to satisfy the requirements of the present invention. Comparative Examples 42 to 43 do not contain the low-melting element B and do have Si average minor axis widths of greater than 4 µm, failing to satisfy the requirements of the present invention. Comparative Examples 44 to 47 do not contain the first additional element A, failing to satisfy the requirements of the present invention. Comparative Examples 48 to 55 have Si average minor axis widths of greater than 4 µm failing to satisfy the requirements of the present invention.

As described above, adopting Si as a principal phase and containing a first additional element A being at least one selected from Ti, V, Cr, Mn, Fe, Co, Ni, Cu, Zr, Nb and Mg and a low-melting additional element B being at least one selected from S, Se, Te, Sn, In, Ga, Pb, Bi, Zn, Al and Ag make it possible (1) to further improve or enhance electrical conductivity of active material Si phase by synergistic effect of the intermetallic compound and the low-melting element and (2) to further alleviate the stress caused by volume change of Si during charging and discharging by the interaction of the intermetallic compound phase and the low-melting element by virtue of the flexible low-melting element B being distributed in a dotted manner and also by the addition of carbon. Moreover, also having extreme fineness and an average value of the thickness in thin width direction of 4 µm or less, the anode material has excellent effects with high charge-discharge capacity and superior cycle life.

The invention claimed is:

1. A Si-based alloy anode material for lithium ion secondary batteries, comprising an alloy phase composed of a Si principal phase comprising Si and a compound phase consisting of two or more elements,
   wherein the two or more elements comprise a first additional element A being at least one selected from the group consisting of Ti, V, Cr, Mn, Fe, Co, Ni, Cu, Zr, Nb and Mg and a low-melting second additional element B being at least one selected from the group consisting of S, Se, Te, Sn, In, Ga, Pb, Bi, Zn, and Al,
   wherein the compound phase consists of:
   a first compound phase comprising Si and the first additional element A;
   a second compound phase comprising the first additional element A and the second additional element B; and
   one or both of a third compound phase comprising two or more of the second additional elements B and a single phase of the second additional element B, or, alternatively, consists of:

a compound phase comprising Si and the first additional element A; and a compound phase comprising two or more of the second additional elements B and optionally a single phase of the second additional element B, and wherein the Si principal phase has an average minor axis width of 4 μm or less.

2. The Si-based alloy anode material according to claim 1, wherein the compound phase comprising two or more of elements consists of:

a first compound phase comprising Si and the first additional element A;

a second compound phase comprising the first additional element A and the second additional element B; and one or both of a third compound phase comprising two or more of the second additional elements B and a single phase of the second additional element B.

3. The Si-based alloy anode material according to claim 1, wherein the compound phase comprising two or more of elements consists of:

a compound phase comprising Si and the first additional element A; and a compound phase comprising two or more of the second additional elements B and optionally a single phase of the second additional element B.

4. The Si-based alloy anode material according to claim 1, containing the first additional element A in an amount of 0.5 to 40 at %.

5. The Si-based alloy anode material according to claim 1, containing the second additional element B in an amount of 0.1 to 25 at %.

6. The Si-based alloy anode material according to claim 1, containing the first additional element A and the second additional element B in a total amount of 12 to 25 at %.

7. The Si-based alloy anode material according to claim 1, wherein the Si-based alloy anode material contains at least Cu as the first additional element A in an amount of 0.5 to 75 at %, wherein the first compound phase has a composition of $Si_xCu_y$ phase, provided x<y, and wherein the Si principal phase is surrounded by an intermetallic compound phase comprising $Si_xCu_y$ phase.

8. The Si-based alloy anode material according to claim 1, wherein the Si-based alloy anode material contains at least Cr and Ti as the first additional element A in a total amount of 12 to 21 at %, which includes Ti amount being 0 at %, and Cr %/(Cr %+Ti %) ratio is 0.15 to 1.00.

9. The Si-based alloy anode material according to claim 1, containing one or more of an element selected from the group consisting of Sn, Cu and Bi in an amount of 0.1 to 5 at %.

10. The Si-based alloy anode material according to claim 1, containing Sn in an amount of 0.1 to 3 at %.

11. The Si-based alloy anode material according to claim 1, containing Bi in an amount of 0.1 to 3 at %.

12. The Si-based alloy anode material according to claim 1, wherein the Si principal phase has amorphous structure.

* * * * *